(12) United States Patent  
Abercrombie

(10) Patent No.: US 7,174,281 B2  
(45) Date of Patent: Feb. 6, 2007

(54) METHOD FOR ANALYZING MANUFACTURING DATA

(75) Inventor: David Abercrombie, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 765 days.

(21) Appl. No.: 10/135,383

(22) Filed: May 1, 2002

(65) Prior Publication Data

US 2003/0208286 A1 Nov. 6, 2003

(51) Int. Cl.
*G06F 17/10* (2006.01)
(52) U.S. Cl. .............................. 703/2; 700/108; 702/84
(58) Field of Classification Search ................... 703/2; 700/108, 110, 121; 702/81, 84; 716/4; 438/14
See application file for complete search history.

(56) References Cited

U.S. PATENT DOCUMENTS 5,963,881 A * 10/1999 Kahn et al. .................... 702/35
6,243,615 B1 * 6/2001 Neway et al. .............. 700/108
6,389,366 B1 * 5/2002 Heavlin ........................ 702/84
6,477,685 B1 * 11/2002 Lovelace ........................ 716/4
6,662,070 B1 * 12/2003 Conboy et al. ............. 700/121
6,735,492 B2 * 5/2004 Conrad et al. .............. 700/121

\* cited by examiner

*Primary Examiner*—Albert W. Paladini
(74) *Attorney, Agent, or Firm*—Fitch, Even, Tabin & Flannery

(57) ABSTRACT

A method of manufacturing, e.g., integrated circuits, and of managing a manufacturing process. Product unit (circuit) variation data is collected from clustered product units (wafer sites). Collected data is grouped according to a selected manufacturing parameter. Each group is normalized for the selected manufacturing parameter. Normalized groups are combined. Normalized process data is checked for variances and the data is regrouped and renormalized until variances are no longer found. Each identified variance is correlated with a likely source. Then, each said likely source is addressed, e.g., a tool is adjusted or replaced, to minimize variances.

8 Claims, 11 Drawing Sheets

METHOD FOR ANALYZING MANUFACTURING DATA

BACKGROUND OF THE INVENTION

1. Field of the Invention

The present invention is related to manufacturing data analysis and more particularly to semiconductor process manufacturing data analysis.

2. Background Description

Typically, integrated circuit chips are manufactured by forming a grid of chips clustered onto a single semiconductor wafer, e.g., a silicon wafer. The grid may have a thousand or more chip (die) sites or locations. Chip patterns may be formed on the wafer photolithographically, layer by layer. Once all of the layers have been formed the wafer, it is diced to separate the individual chips (die). Furthermore, groups of 20 or more wafers are normally formed more or less at the same time. Each of these groups is called a lot. Ideally, every chip on each wafer in every lot forms identically with every other chip on every other wafer in every other lot, such that all chips of the same chip type are identical. However, realistically, no two chips are identical. Chip parameters always exhibit some lot by lot variation, as well as wafer by wafer variation within a lot and, chip by chip on each wafer.

Modern semiconductor manufacturing processes are very complex, perhaps, including hundreds of individual process steps from selecting a blank wafer, to forming the layers, to producing the final working product. Manufacturing engineers use various test and metrology tools throughout the process to collect a wide assortment of data on each of these process steps and on the resulting products. These tests measure a wide variety of parameters, encompassing many types of electrical, physical, mechanical and chemical traits, both of the manufacturing process and the product. The parameters include semiconductor process data and measure variations that may be analyzed to identify the source of these variations, whether from the tools, recipes, people, etc. This measurement data is analyzed in an attempt to qualitatively and quantitatively define various relationships, e.g., how the measured parameters affect the performance and quality of the products produced.

Normally, these parameters describe the performance and physical characteristics of semiconductor products and, generally, can only be collected from finished product resulting from, potentially, hundreds of separate processing steps. In addition with multiple tools used at each process step, each tool adding some parametric variation, it is no surprise that the combined influence of all of these independent variations on different parameters makes isolating any one out-of-spec source difficult. Very often, prior art approaches identified numerous false positive and false negatives. A straight forward statistical analysis approach isolates significant data from one source at a time by sorting the data such that all other potential sources are common for each sort. This "divide and conquer" approach divides the entire population into subgroups that each may contain too few points for the statistical tools to discern differences of any real meaning.

For example, a Product Engineer (PE) may have product that fails to meet customer's performance requirements, i.e., the product is "out-of-spec." The PE must be able to identify and, if possible, isolate chip/process parameters measured at wafer sort or final test that correlate to the failure. Then, the PE must take appropriate action at the identified source of the failure to tighten the variation of chip/process parameters to produce product that once again conforms with the customer's requirements. Additionally, even if the product is "in-spec," currently, the only way to assure that it remains in-spec may be to limit process parameter variation, thereby limiting drift towards process window edges, where performance may degrade. So, for example, product that is performance sorted may fall short e.g., at process window edges. The challenge for the PE is to identify variances from natural groupings of the process flow data that may be arising from different sources, i.e., different test facilities, different tools used at the same step, etc. Once identified, these variances may be corrected to remove or minimize parametric variation. Intelligently analyzing this process data, whether manually or automatically, is critical for the PE. Typically, the PE must confront two data analysis issues.

First, normally, all the "raw" chip level data (die level data) is considered as a whole as randomly generated. However, the data points are seldom independent of each other. At various stages throughout the manufacturing process, data for numerous chips may be related. Die 1 on wafer 1 in lot 1 cannot be run on a separate tool than die 2 on wafer 1 in lot 1. Die from the same wafer are manufactured more or less simultaneously and in parallel. Wafers from each lot are grouped together for step by step processing. At different steps wafers from the same lot may be subdivided/processed on different equipment and then, intermixed or recombined. However, traditionally, all of the wafer data from each lot and, even from several lots, is combined and collapsed into a few simple lot level statistics (e.g., a lot mean and a lot standard deviation) that are used for process analysis.

Second, once the process data is collected and differences are resolved statistically, information that data must be related back to the process sequence without false positive or false negative identification errors. There are, primarily, two sources of these errors. First, since there are so many process steps and because the targeted parameter differences may be so small, a huge amount of data may be necessary to statistically correlate the results. Second, lots and wafers within each lot are not randomly processed. Instead, wafers are somewhat methodically grouped and processed on tools available at each processing step. Consider for example, a simple processing matrix of 3 steps with 3 tools available at each step. If one of the three possible tools is "bad" at step 1; then, it should not be assumed that the lots run on this bad tool are thoroughly and randomly mixed with lots from each of the other 2 tools for subsequent processing at step 2 amongst the three possible tools for that step. Otherwise, making such an assumption would result in a false difference from the statistical comparison of the lot data among the three tools at step 2 where in actuality none exists. The traditional divide and conquer solution was to select only data for step 1 in which the combinations at all other steps are uniform (i.e. all through the same tool at each of step 2, 3, etc.). This restriction greatly reduces the amount of available data, exacerbating the need for large amounts of data for analysis.

BRIEF DESCRIPTION OF THE INVENTION

It is a purpose of the present invention to correlate process variations to a likely source of the variations;

It is another purpose of the invention to increase the data available for correlating a particular tool to process variations arising in that tool;

It is yet another purpose of the invention to selectively correlate process variations in semiconductor manufacturing process data collected from integrated circuit chips to one or more process tools responsible for the variations;

It is yet another purpose of the invention to identify an out of spec semiconductor manufacturing tool from process data collected from integrated circuit chips formed in at least one processing step both on the out of spec as well as in spec semiconductor manufacturing tools.

The present invention is a method of manufacturing, e.g., integrated circuits, and of managing the manufacturing process. Product unit (circuit) variation data is collected from clustered product units (wafer sites). Collected data is grouped according to a selected manufacturing parameter. Each group is normalized for the selected manufacturing parameter. Normalized groups are combined. Normalized process data is checked for variances and the data is regrouped and renormalized until variances are no longer found. Each identified variance is correlated with a likely source. Then, each said likely source is addressed, e.g., a tool is adjusted or replaced, to minimize variances. Thus, by rendering data collected from semiconductor die that are processed on wafers grouped into lots, the method of the present invention provides more informative analysis results from new lot level statistical variables.

BRIEF DESCRIPTION OF THE DRAWINGS

The foregoing and other objects, aspects and advantages will be better understood from the following detailed preferred embodiment description with reference to the drawings, in which.

DESCRIPTION OF A PREFERRED EMBODIMENT

The reduction in the amount of available data for correlating process parameter variations with individual sources of the process parameter variations described above may be avoided by a way to correlate process parameter variations to individual sources of those variations using the entire population of characterization data as follows.

Figure 1:
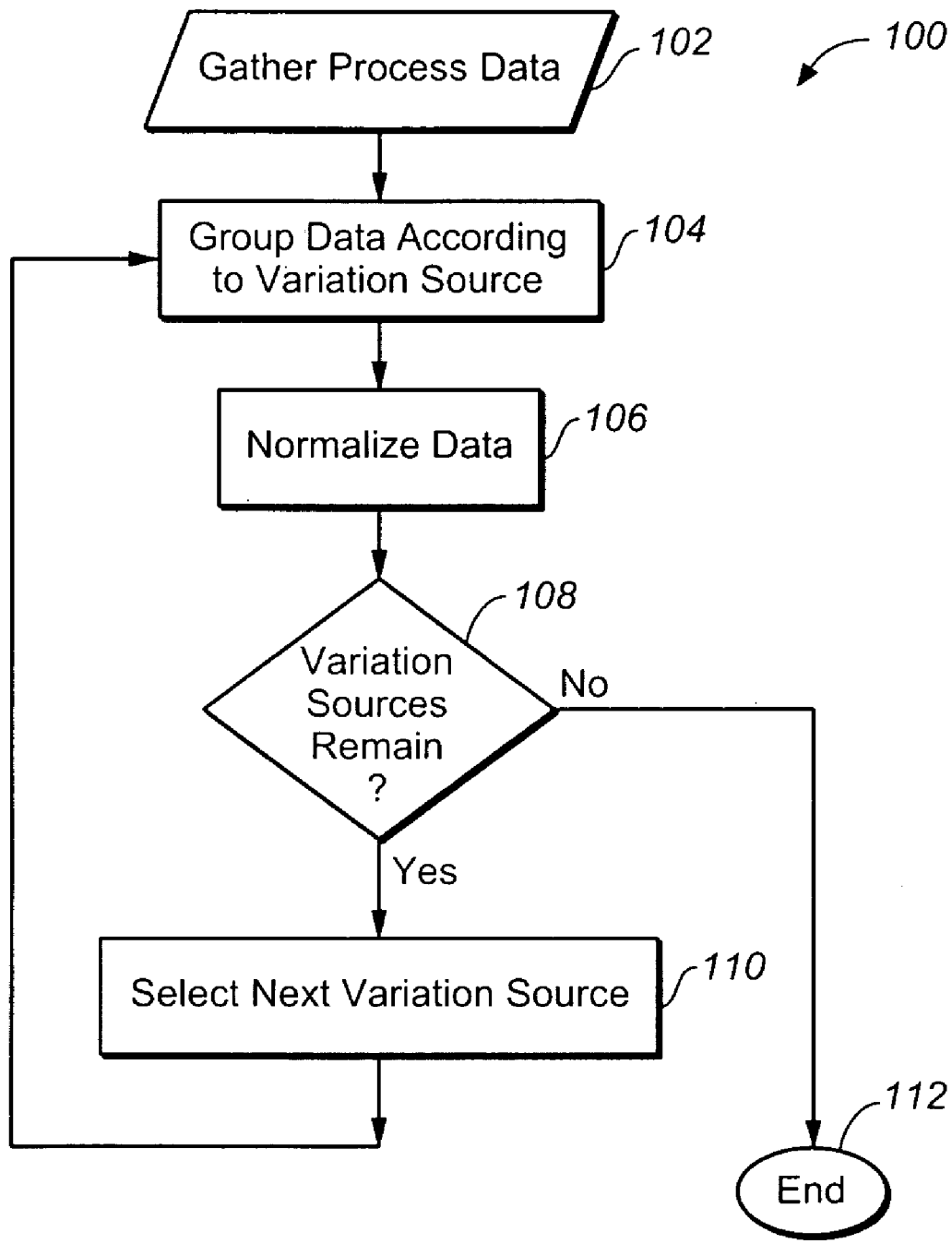
FIG. 1 shows a method of selectively removing a variation source so that an entire collection of process data may be used to identify additional sources of variation.

Turning now to the drawings and more particularly, FIG. 1 shows a method 100 of selectively removing a source of product variation so that an entire collection of process data may be used to identify additional sources of process variation. Each process step may affect the mean value of a parameter or increase the variance of the parameter. For any manufacturing process wherein each process step contributes to product variations additively, the preferred embodiment method 100 selectively removes variation sources for enhanced analysis. Although described hereinbelow with reference to integrated circuits and semiconductor manufacturing, the present invention has application to any manufacturing process wherein multiple units or clusters of the same product unit are formed concurrently.

So, first, in step 102, the data is collected. Then, in step 104, the data is grouped according to a targeted distinct variation source. Next, in step 106, the variation is removed as each group is normalized for a zero mean and for unit variance. Then, in step 108 the process data is combined and checked for other variation sources. If any remain, in step 110 the next source is identified free from the removed variation, i.e., free from the influence of the source of that variation. Returning to step 104, this data normalization is repeated until no other variation sources show significant differences in step 108 and, analysis ends in step 112.

Thus, by rendering data collected from semiconductor die that are processed on wafers grouped into lots, the preferred embodiment method 100 provides more informative analysis results from new lot level statistical variables. These new statistical variables effectively increase the data signal to noise ratio, allowing specific types of variation related to the processing to be separated out. The preferred embodiment method 100 uses known characteristics of standard semiconductor process equipment configurations to facilitate extracting meaningful product/process statistics. For instance, multiple chambered tools serially process wafers that may be at different stages in each of the chambers. Thus, chips can exhibit radial variation from wafer center to edge. Further, this radial variation can itself vary from chamber to chamber, e.g., each chamber may have some spatial radial variation within it and, the tool can behave differently from lot to lot. So, to separate and isolate possible variations within a lot, for example, to provide a single lot level statistic for discerning particular differences in tools, new specific lot level statistics are generated. These new lot level statistics include: lot means ($\overline{L}$), which facilitates determining target offsets between tools; standard deviation of wafer means ($\sigma_{\overline{wafer}}$), which provides a measure of wafer to wafer consistency; mean wafer standard deviation ($\overline{\sigma_{wafer}}$), which provides a measure of wafer uniformity from lot to lot; and, standard deviation of wafer standard deviations ($\sigma_\sigma$), which measures wafer consistency from lot to lot.

Figure 2:
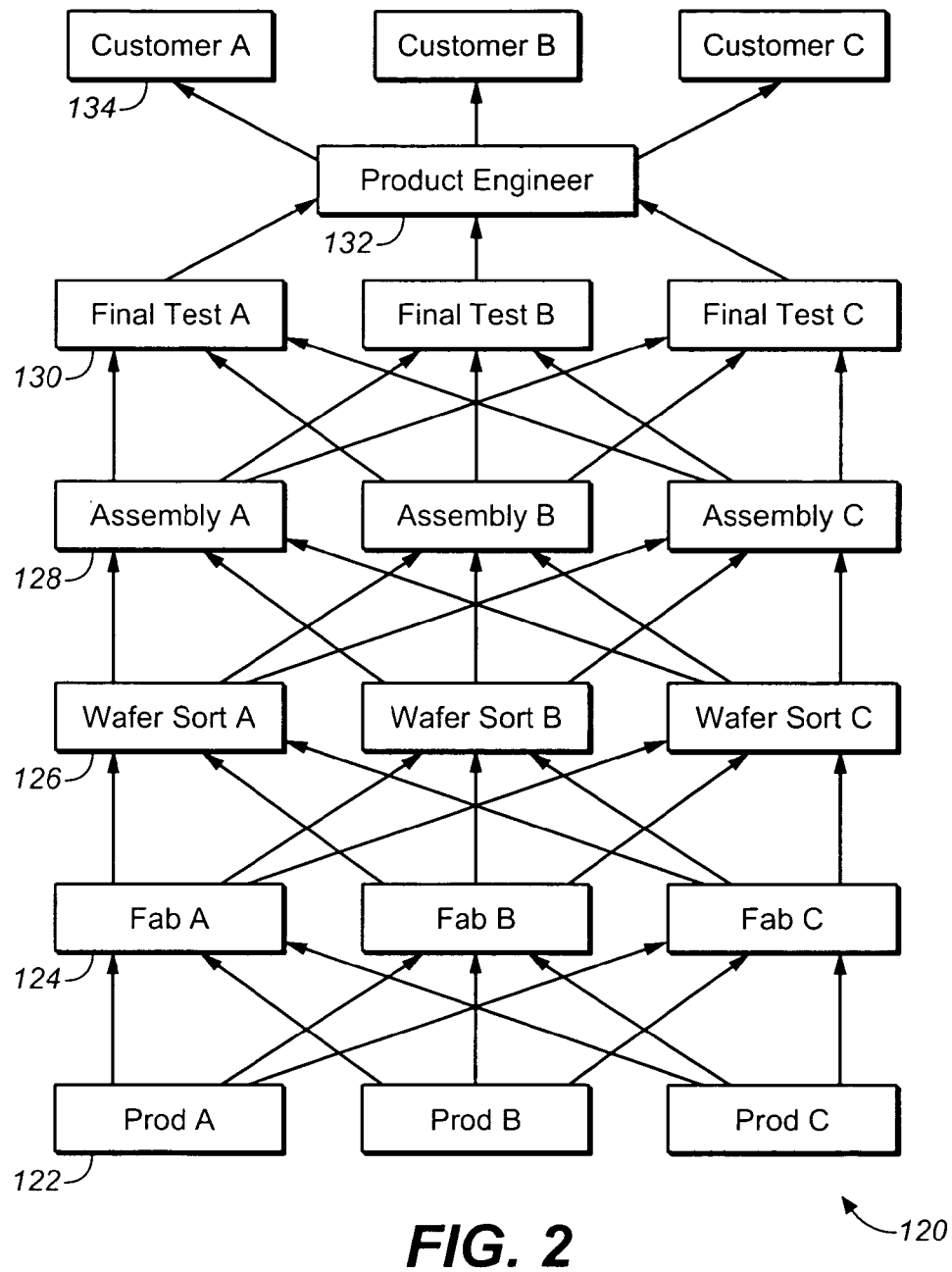
FIG. 2 shows a simple example of the process stages that each lot may go through during manufacturing and production.

FIG. 2 shows a simple example 120 of the process stages that each lot may go through during production. Starting at the bottom level 122, a product is a unique design with different processing and test characteristics. In level 124 a Fab is the facility where the lot is fabricated. In level 126 each die on the individual wafers are initially tested in a wafer sort. Generally, each lot is tested on a single tester. In assembly level 128 the die are packaged. Level 130 is the last stage encountered where the packaged die are subjected to a final test before the PE 132 decides which products can be shipped to a customer in level 134.

Figure 3:
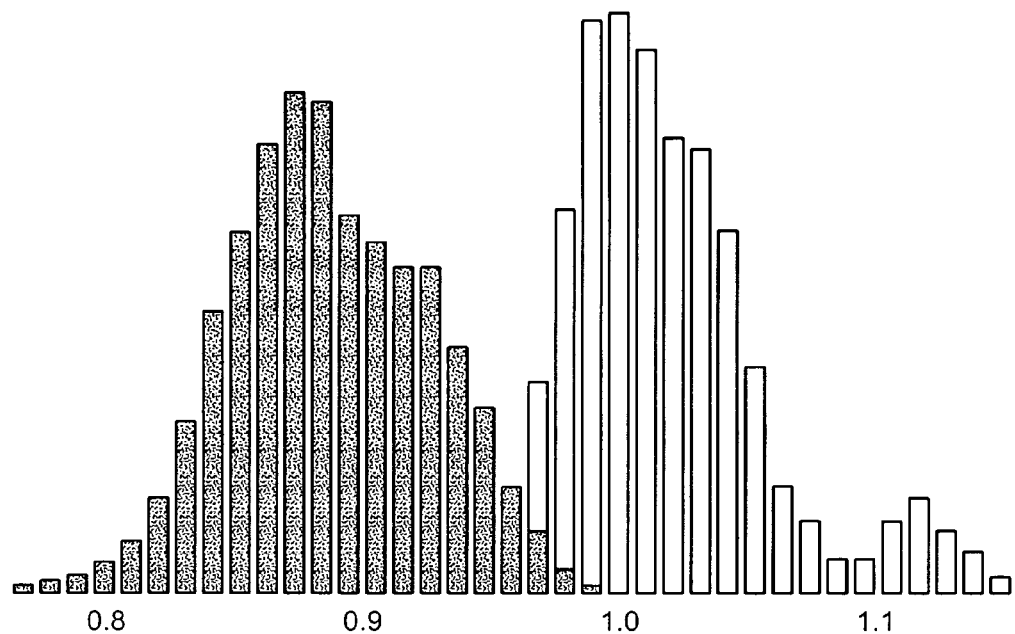
FIG. 3 shows an example of polysilicon line resistance measurements from the same test structure on two different products.

FIG. 3 shows an example of polysilicon line resistance measurements from the same test structure on two different products. As can be seen, identical test structures can render completely different data distributions. Each stage (122–130 of FIG. 2) may be a source of variation. Differences between different product designs 122 may cause apparent variations even if the parameter being measured is not considered design-dependent. This is often overlooked because it seems safe to assume that a parameter that is characterized by an identical test circuit in different products will not reflect any variation caused by the product design. This assumption is seldom true. Other factors such as, for example, the density of the circuit shapes surrounding the test structure can cause variability in the fab 124 at photo and etch stages of production.

Also, each Fab (stage 124) may include hundreds of tools and each lot may be processed by a different tool at each fabrication step. Every tool is a source of some variation and, generally, there will be variation among different facilities since tools are usually calibrated and maintained locally. At wafer sort 126 differences in tester calibration, temperature, probe pins wear and debris on the contact pads all can contribute to variation in the measured parameter values. Assembly 128 can introduce variation due to differences in machine tuning, operator training, and variability in packaging material properties.

The location of test structures within the die may also introduce variance. For example, a test structure located near the edge of the die may perform differently than a test structure at the center of the die. Similarly, the size of the die will affect how the test structures are distributed across the wafer. Larger (smaller) die will have fewer (more) die at the wafer edge and, therefore, have less (more) parameter variation due to die location.

As noted hereinabove, the traditional approach to isolating/removing these differences is to sort and divide the process data into homogeneous subsets. For example, to eliminate product-induced variance, the process data may be subdivided for a particular date into different subsets for each product. The disadvantage of this approach is that it reduces the data for a given product and, therefore, dilutes the power of the statistical methods, such as the well known linear analysis of variance (ANOVA), to identify sources of variability. In particular, identifying the primary sources of variation is further hindered by the relative interdependence of stages. The statistical assumption that each lot from one stage has an equal probability of going to each of the possible facilities of the succeeding stages is usually not true. Thus, the approach of the present invention overcomes these disadvantages.

So, $\overline{L}$ is a measure of the consistency of the lot distribution mean from lot to lot. For example, at Step 1 Tool A may produce lots with consistently different distribution means than Tool B. This result may be independent of the data spread. $\overline{L}$ is best for determining targeting offsets between tools. $\sigma_{\overline{wafer}}$ measures how consistent the means of the wafers are within a lot compared to another lot. So, again at Step 1, all wafers in a given lot run through Tool A may have nearly the same mean, whereas wafers in another lot run through Tool B may have means that are very different from each other. This can occur, for example, when modern multi-chambered tools are used, where one chamber is bad, causing a problem within lots processed by that tool. Since some of the wafers in each lot are processed in the bad chamber and others in good chambers, wafers from the same lot have means that are different from each other. Thus, $\sigma_{\overline{wafer}}$ is independent of the mean shift from lot to lot and, is best for determining tool inconsistencies.

Figure 4:
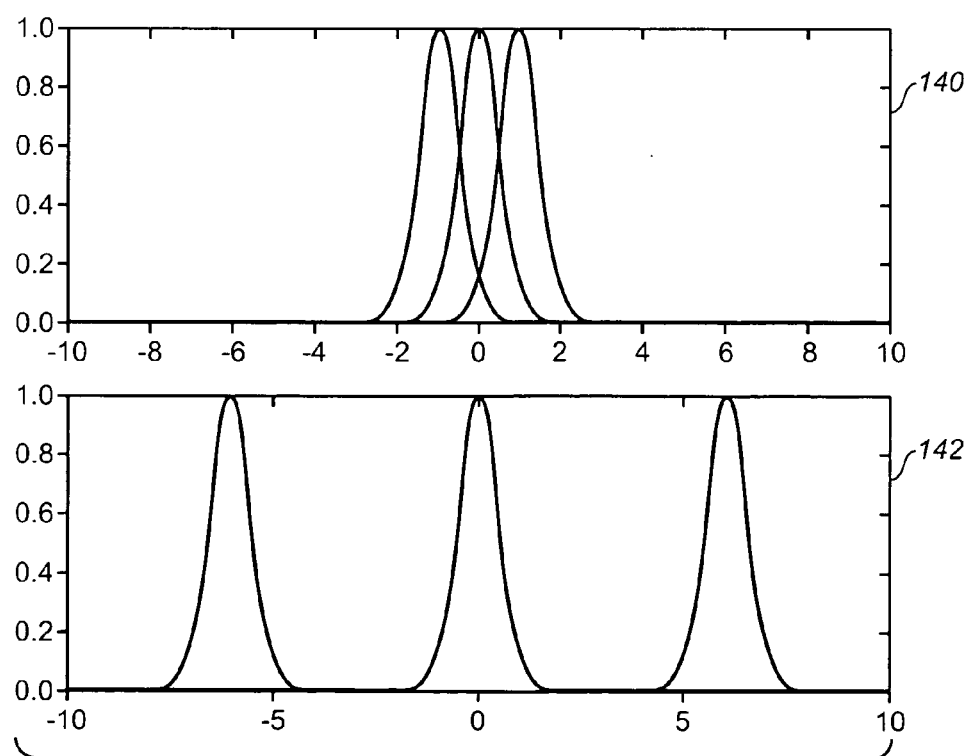
FIG. 4 shows distribution plots for each of two lots with different $\sigma_{\overline{wafer}}$.

FIG. 4 shows distribution plots 140, 142 for each of two lots with different $\sigma_{\overline{wafer}}$. Each lot includes measurements from three wafers represented by individual Gaussian distribution curves. The three distributions in the upper plot 140 are much more tightly grouped (i.e., have a lower $\sigma_{\overline{wafer}}$) than the distributions in the lower plot 142. $\sigma_{\overline{wafer}}$ is a very different measure than $\overline{L}$. For example, the two lots shown in FIG. 4 have the same value for $\overline{L}$ even though they have very different values for $\sigma_{\overline{wafer}}$.

$\overline{\sigma}_{wafer}$ is a measure of how the typical spread of the data across a wafer within one lot compares to the typical spread across a wafer in another lot. The average spread of data at Step 1 across any given wafer in a lot on Tool A may be significantly different than the same spread from lots on Tool B. This occurs because most semiconductor process tools have some significant spatial variation across the wafer. $\overline{\sigma}_{wafer}$ is independent of the mean shift from wafer to wafer within each lot and independent of the mean shift from lot to lot. $\overline{\sigma}_{wafer}$ is best for comparing across-wafer uniformity between tools.

Figure 5:
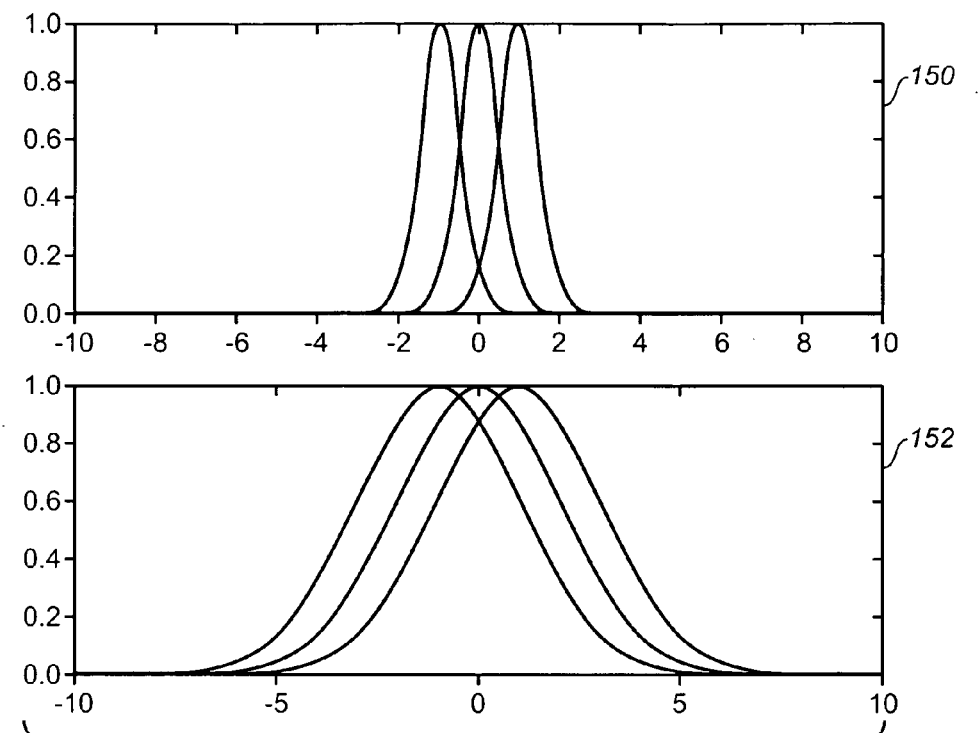
FIG. 5 shows distribution plots in an example of two lots of three wafers, each lot having different $\overline{\sigma_{wafer}}$.

FIG. 5 shows distribution plots 150, 152 in an example of two lots of three wafers, each lot having different $\overline{\sigma}_{wafer}$. The top plot shows a lot with a smaller $\sigma_{\overline{wafer}}$ than the bottom plot, which is similar to $\overline{\sigma}_{wafer}$, provides a distinct measure lot-level variability. For both of these plots 150, 152, $\overline{L}$ and, in addition, $\sigma_{\overline{wafer}}$ are same. Thus, all three provide different information about the process.

Figure 6:
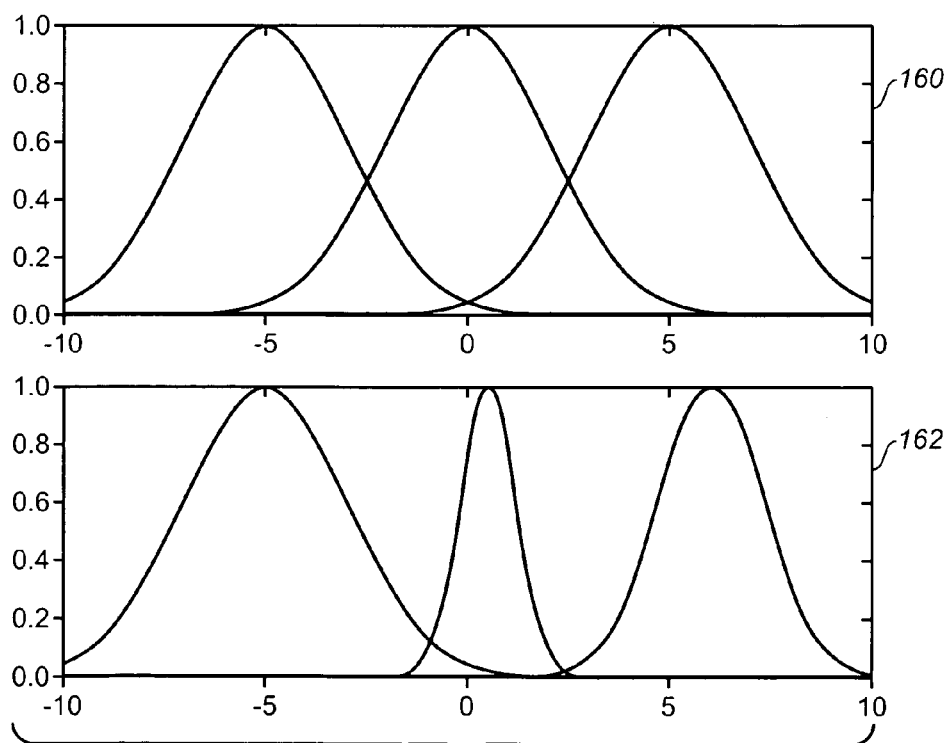
FIG. 6 shows distribution plots in an illustration of $\sigma_\sigma$ for two lots, again with three different distributions for each of three wafers.

FIG. 6 shows distribution plots 160, 162 in an illustration of $\sigma_\sigma$ for two lots, again with three different distributions for each of three wafers. The variation of the wafer standard deviations is greater in the bottom plot 162 than in the top plot 160. $\sigma_\sigma$ is a measure of consistency across wafer spread within one lot (e.g., plot 160) as compared to another lot. Differences in $\sigma_\sigma$ can be caused by differences in the spatial uniformity within the wafers in a lot. So, for example, the spread of across wafer spreads at Step 1 in a lot run on Tool A may be different from the spread of across wafer spreads in a lot on Tool B. This lack of consistency occurs when there are differences in spatial uniformity from chamber to chamber within a tool, e.g., one tool may have consistent chambers and another inconsistent chambers. $\sigma_\sigma$ is independent of the average spread across the wafer, the mean shift from wafer to wafer within the lot, and the mean shift from lot to lot. $\sigma_\sigma$ is best for comparing differences in uniformity across wafer within the tool, e.g., between chambers and can be used to identify process stages that cause significant variability across wafers within a lot. For example, probe cards might need to be scrubbed several times during wafer sort.

Previously, these variations were considered together and described by one standard deviation for the lot. Thus, many hidden "signals" were lost or overlooked that otherwise are useful for correlating a problem to a specific tool. So, for example, where one tool has a problem at one step and another tool has a different problem at another step, prior art failure analysis methods did not lend themselves conveniently to separately identifying both problems. However, by application of the present invention, $\overline{L}$, $\sigma_{\overline{wafer}}$, $\overline{\sigma}_{wafer}$, and $\sigma_\sigma$ can be used to extract information for identifying primary sources of variation and, possibly, the best opportunity for data variance reduction. By reducing mutual interference in the data, it becomes relatively simple to separate and correlate problems.

Accordingly, the preferred embodiment of the present invention has application to semiconductor process flow analysis, as well as to analyzing electronic test data to identify problem sources. A particular tool stage may be singled out as the most likely source of variation and, under some circumstances, what might be wrong with the stage may also be identified. Further, each of the specific linear statistical variables described above may be replaced with a more robust statistic counterpart, e.g., median, interquatile range (IQR), etc., without departing from the spirit or scope of the invention.

Figure 7:
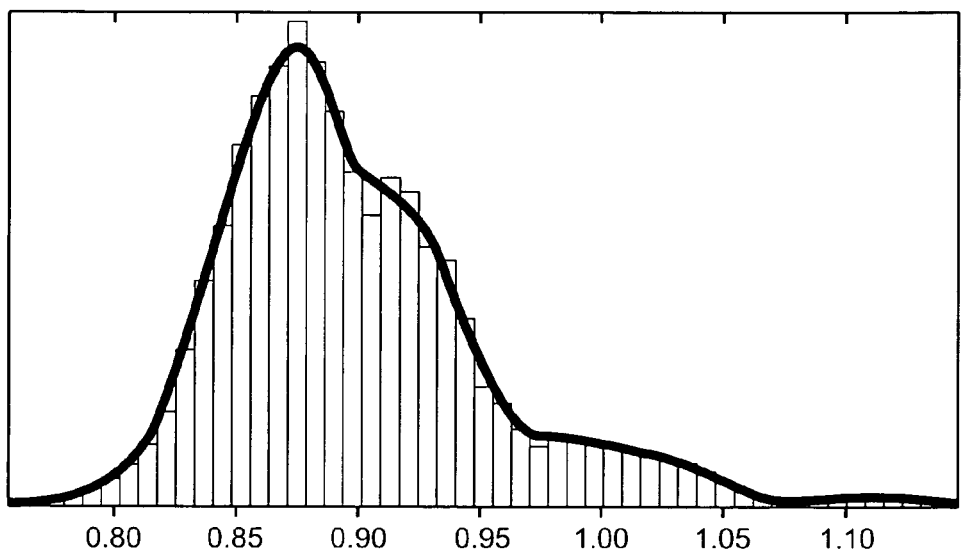
FIG. 7 shows an example of a histogram of the maximum clock rate for two particular integrated circuits.

FIG. 7 shows an example of a histogram of the maximum clock rate for two particular integrated circuits. The histogram data was collected from two products; 20 lots of product A and 50 lots of product B. To determine the best opportunity for variance reduction, first the variation among products was removed by subtracting the product mean and normalizing the standard deviation to one for each product.

Figure 8:
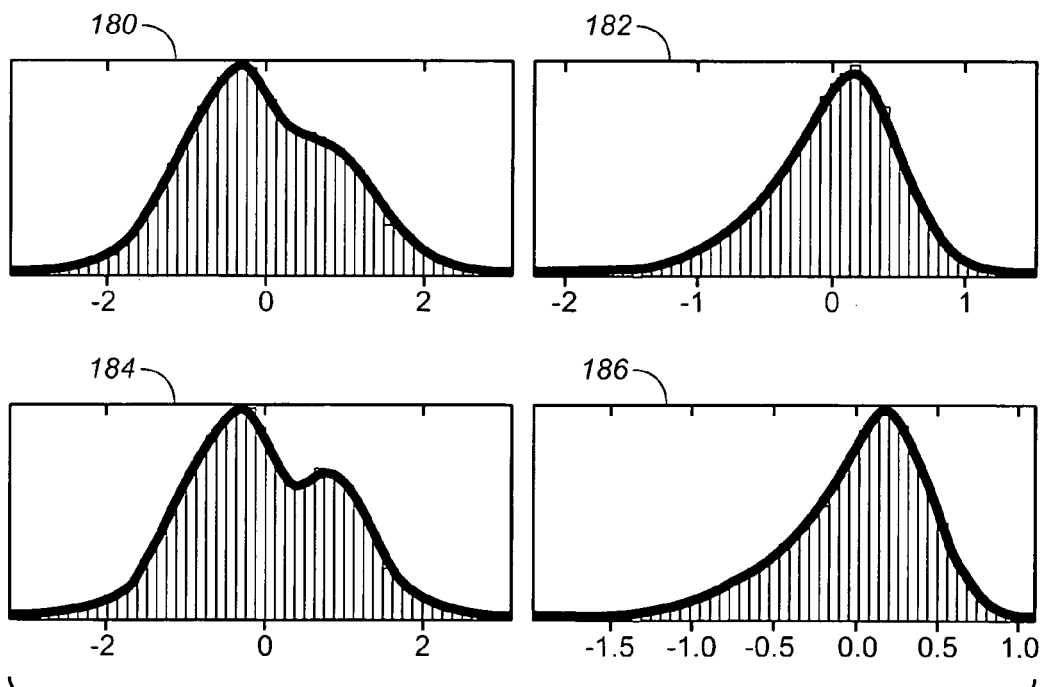
FIG. 8 shows variance removal according to the present invention to find the best tightening opportunity.

FIG. 8 shows variance removal according to the present invention to find the best tightening opportunity. Histogram 180 shows the result of removing differences in the mean and standard deviation of the data from both products. This plot 180 serves as a baseline for comparing other opportunities for variance reduction.

Histogram 182 shows the same normalized data after subtracting $\overline{L}$, i.e., the standard deviation of $\overline{L}$ is reduced to zero. This histogram 182 also represents the hypothetical result where every lot has exactly the same mean, but each distribution was otherwise the same. In this example, the standard deviation would be reduced to 0.52, which is 48% less than the normalized data of histogram 180.

Histogram 184 shows the normalized data with the wafer means within each lot shifted to $\overline{L}$. Functionally, this is achieved by subtracting each individual wafer mean and adding $\overline{L}$ to each data point, thus shifting all distributions to $\overline{L}$ and reducing $\sigma_{\overline{wafer}}$ to zero. This histogram 184 also represents the hypothetical result where the wafers in each lot have identical means while the variability of $\overline{L}$ is preserved. In this example, the overall standard distribution was only reduced to 0.92 (8%).

Histogram 186 shows the normalized data with the wafer means within each lot removed, representing the variations across all wafers, i.e., $\overline{\sigma_{wafer}}$. This reduced the standard deviation to 0.46.

So for this example, approximately half of the overall variation is a lot-to-lot variation and the other half is due to a variation across each wafer, i.e., die to die. Also, wafer variation within lots was not significant, so there is little opportunity for reducing variability for this example by improving chamber consistency within multiple chamber tools.

So, FIGS. 9A–14D show box plots of an example wherein the present invention is applied to product, fab and wafer sort results for two products, two fabs, and two wafer sort facilities. Box plots convey distribution location and variation information within data and are particularly useful for detecting and illustrating location and variation changes between different groups of data. Typically, as in these examples, the upper end of the box represents the 75$^{th}$ percentile and the lower end the 25$^{th}$ percentile. So, half of the samples are boxed between the upper and lower bounds of the box. Further, the upper and lower measured data ranges are demarcated by a horizontal line. Outliers are indicated by a plus (+) sign. The median of each lot distribution is demarcated by a horizontal line at joined beveled intermediate box edges. In each of FIGS. 9A–D and through 14A–D, the figure labeled A shows $\overline{L}$ for the particular stage, the figure labeled B shows $\sigma_{\overline{wafer}}$, the figure labeled C shows $\overline{\sigma_{wafer}}$ and the figure labeled D shows $\sigma_o$ for that stage.

FIGS. 9A–D shows box plots the data grouped according to product for the described new analysis statistical variables. At product level, the p-values for each of the preferred statistics are 0.000, 0.0479, 0.0051 and 0.0001 for FIGS. 9A, B, C, D, respectively. P-values are an indication of the difference between lots at each stage, with the lower p-value indicating a greater difference and, correspondingly, a greater variance. FIGS. 10A–D shows box plots of the same data grouped according to product after removal of the difference in $\overline{L}$. The p-values are 0.8720, 0.0811, 0.0010 and 0.0002, respectively, indicating a much reduced variance in the mean of the two lots as would be expected. FIGS. 11A–D show box plots of the same data grouped according to fab with corresponding p-values of 0.0005, 0.4277, 0.0000 and 0.0549. FIGS. 12A–D show box plots of the data grouped according to fab after removal of the difference in $\overline{L}$. The corresponding p-values are 0.0000, 0.4417, 0.0000 and 0.0456. FIGS. 13A–D shows box plots of the same data grouped according to wafer sort facility and with corresponding p-values 0.4711, 0.6953, 0.1742 and 0.6816. FIGS. 14A–D show box plots of the same data grouped according to wafer sort facility after removal of the difference in $\overline{L}$. The p-values are 0.8880, 0.7056, 0.1695 and 0.6462, respectively.

Figure 9A:
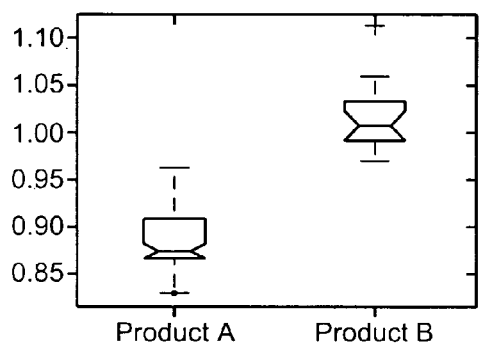
FIGS. 9A–D shows box plots the data grouped according to product for the described new analysis statistical variables.
Figure 9B:
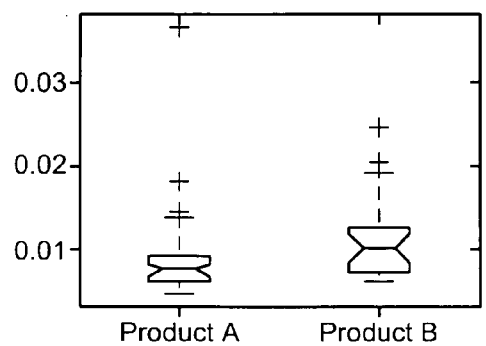
Figure 9C:
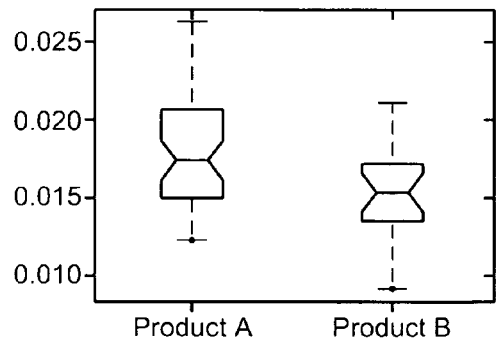
Figure 9D:
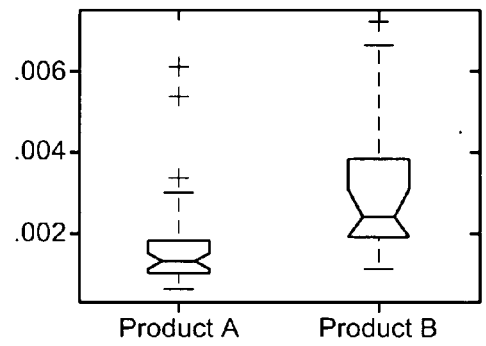
Figure 10A:
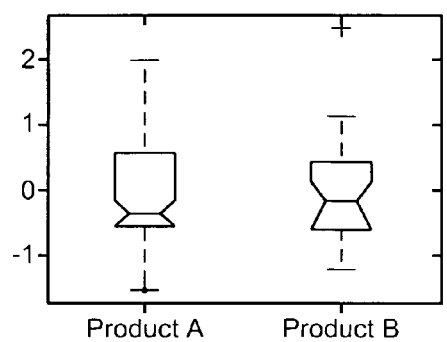
FIGS. 10A–D shows box plots of the same data of FIGS. 9A–D, grouped according to product after removal of the difference in $\overline{L}$.
Figure 10B:
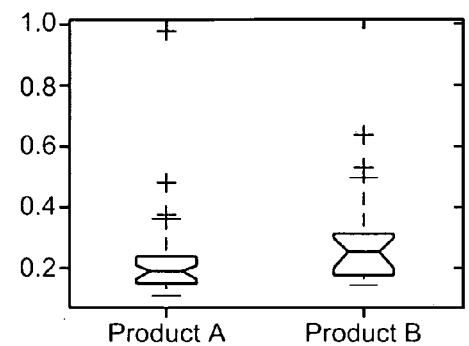
Figure 10C:
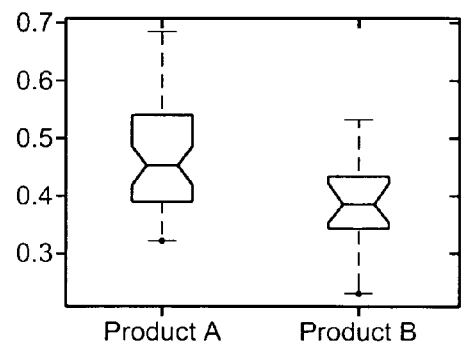
Figure 10D:
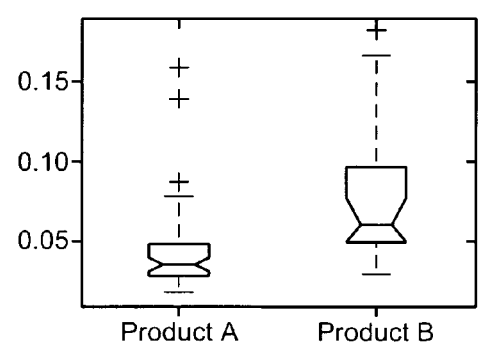
Figure 11A:
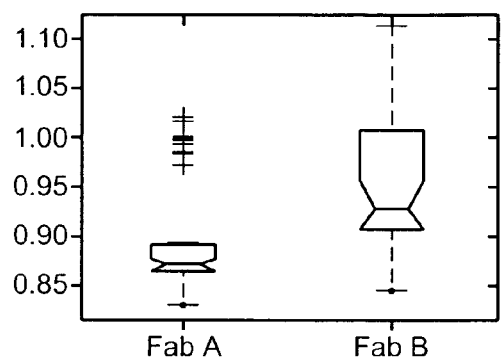
FIGS. 11A–D show box plots of the same data grouped according to fab.
Figure 11B:
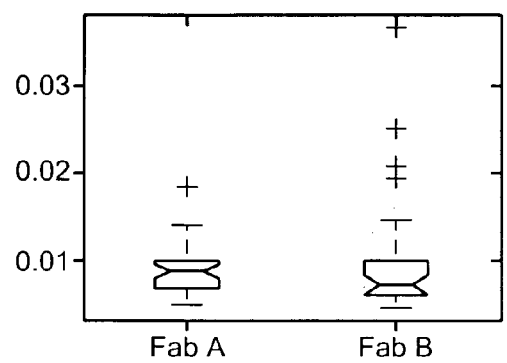
Figure 11C:
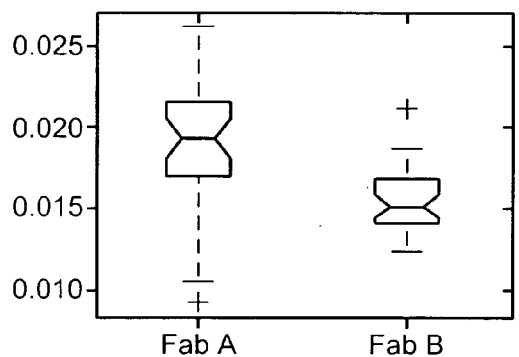
Figure 11D:
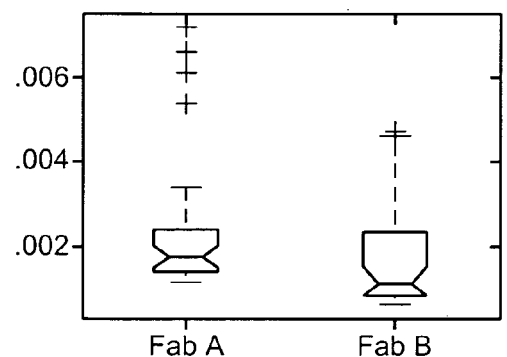
Figure 12A:
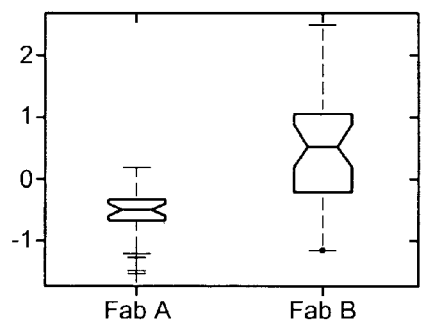
FIGS. 12A–D show box plots of the same data grouped according to the fab after removal of the difference in $\overline{L}$.
Figure 12B:
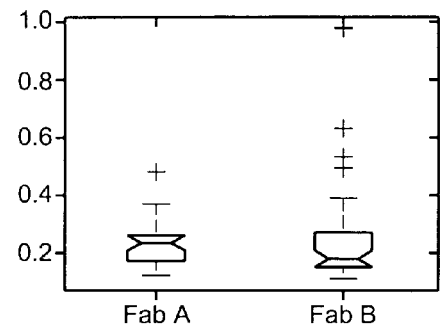
Figure 12C:
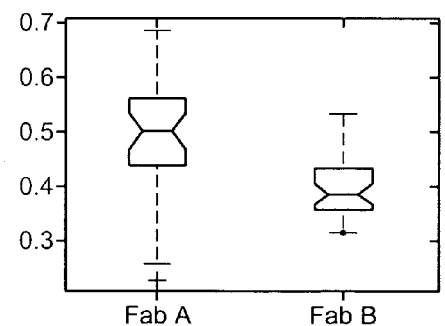
Figure 12D:
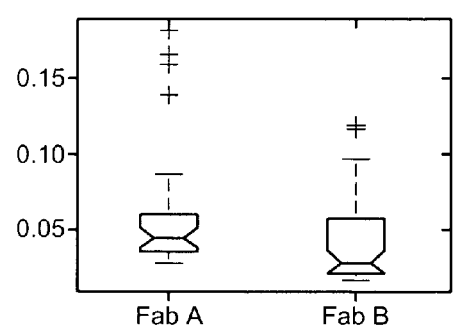
Figure 13A:
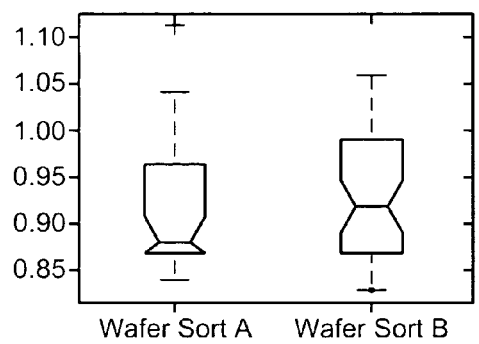
FIGS. 13A–D shows box plots of the same data grouped according to wafer sort facility.
Figure 13B:
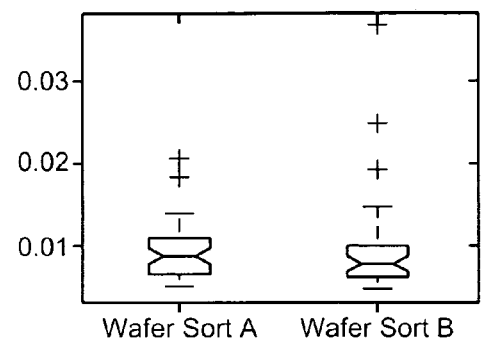
Figure 13C:
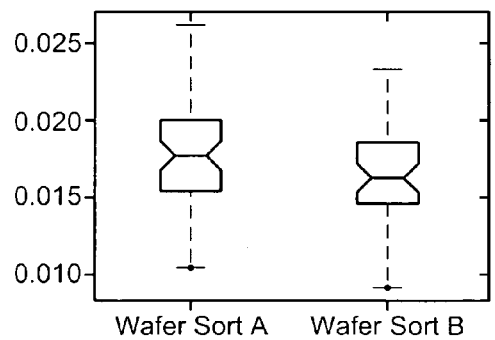
Figure 13D:
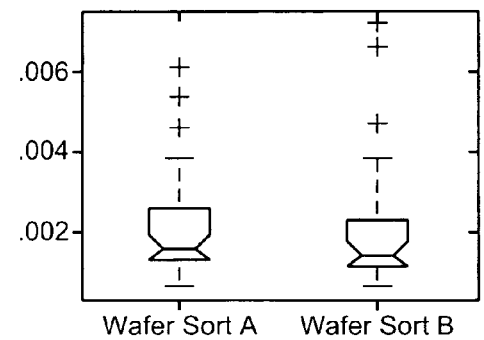
Figure 14A:
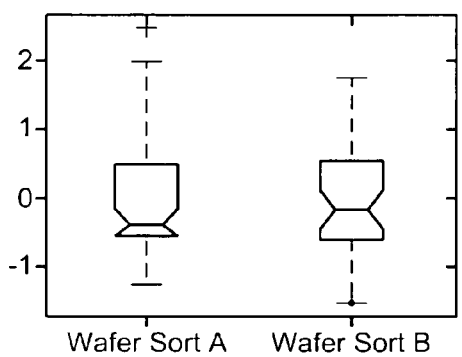
FIGS. 14A–D show box plots of the same data grouped according to wafer sort facility after removal of the difference in $\overline{L}$.
Figure 14B:
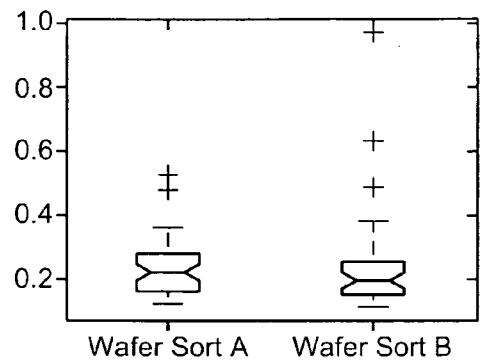
Figure 14C:
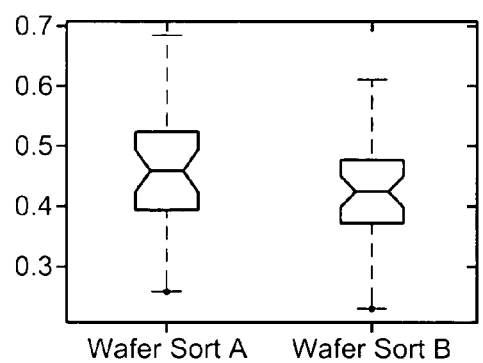
Figure 14D:
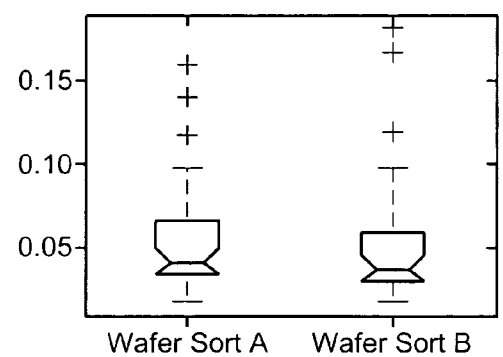

The most striking and statistically significant difference between each of the two groups is in $\overline{L}$, grouped by product in FIG. 9A verses grouped by fab in FIG. 11A. However, from these box plots alone, it is impossible to determine if the source of the difference is one or both of the products and fabs; or, if the difference arises at one of the stages and correlation in the process flow causes both stages to seem to be significant sources of variation. The product difference was eliminated because it was the most statistically significant, i.e., p<0.0001. After further application of the present invention the differences persists between the groups divided by fab. Thus employing the present invention, it may be concluded that both the differences between the two products and between the two fabs caused statistically different lot means.

Advantageously, using the present invention known signals can be removed easily from data, before looking for other signals that might be buried within the data. Thus, the present invention facilitates distinguishing between two or more apparent sources of variation in the same parameter, especially, where one source is causing a false positive and the other is real. By assuming one to be real and removing its affect; determining how much of the second signal remains; and, then, while assuming that the other source is real, and repeating this analysis from the beginning, the result that removes the most signal is most likely to be the true result.

Further, the present invention may be used in experimental analysis, such as where a hidden signal from first order statistical comparative analysis may be in fact an important signal. Such a hidden signal may be removed using the present invention to determine its affects on other signals. Since a particular tool may be selected randomly at a particular step for a group of lots and, as a result, show a significant statistical signal, the most statistically significant signal may in fact not be the most important. Thus, the present invention complements engineering judgment to isolate probable signals (i.e., those with lower statistical correlation), remove their effects, and re-evaluate all signals free from their influence.

While the invention has been described in terms of preferred embodiments, those skilled in the art will recognize that the invention can be practiced with modification within the spirit and scope of the appended claims.

What is claimed is:

1. A method of managing a product through a multi-step manufacturing process, the method comprising steps of:
   (a) collecting process data from product lots of clusters of product units wherein each product lot is characterized by a corresponding lot mean and each cluster is characterized by a corresponding cluster mean;
   (b) grouping the collected process data into groups according to source of variation wherein each group is characterized by a corresponding group mean;
   (c) subtracting the corresponding group mean from each group to generate zero mean group data for each group;
   (d) normalizing a standard deviation of the zero mean group data for each group to generate normalized process data in which group variance is removed;
   (e) subtracting the corresponding lot mean from each product lot in the normalized process data to generate zero lot variance data;
   (f) subtracting the corresponding cluster mean from each cluster and adding the corresponding lot mean to each product lot in the normalized process data to generate zero cluster variance data;
   (g) subtracting the cluster mean from each product lot in the normalized process data to generate zero lot variance and zero cluster variance data; and
   (h) comparing a standard deviation of the zero lot variance data, a standard deviation of the zero cluster variance data, and a standard deviation of the zero lot variance and zero cluster variance data to determine how much variation in the process data results from product lot-to-product lot, from cluster-to-cluster within a product lot, and from product unit-to-product unit within a cluster.

2. The method of claim 1 wherein step (d) comprises normalizing the standard deviation for each group to unit (1) variance.

3. The method of claim 1 further comprising a step of determining an average of cluster standard deviations.

4. The method of claim 1 further comprising a step of determining a standard deviation of cluster means.

5. The method of claim 1 further comprising a step of determining a standard deviation of cluster standard deviations.

6. The method of claim 1 further comprising a step of comparing an average of cluster standard deviations, a standard deviation of cluster means, and a standard deviation of cluster standard deviations to determine whether all sources of variance in the process data have been identified.

7. The method of claim 1 wherein the process data comprises one of polysilicon line resistance measurements and maximum clock rate, each cluster is a semiconductor wafer, and each product unit is an integrated circuit chip.

8. The method of claim 1 wherein the source of variation is one of a difference between product designs, a difference between processing tools, a difference in sorting, and a difference in product assembly.

* * * * *